United States Patent [19]
Keesen

[11] Patent Number: 6,108,378
[45] Date of Patent: Aug. 22, 2000

[54] VIDEO ENCODER AND DECODER IMAGE MOTION ESTIMATION SYSTEM WITH REDUCED COMPUTATION

[75] Inventor: Heinz-Werner Keesen, Hannover, Germany

[73] Assignee: Deutsche Thomson-Brandt GmbH, Villingen-Schwenningen, Germany

[21] Appl. No.: 08/354,929

[22] Filed: Dec. 13, 1994

[30] Foreign Application Priority Data

Dec. 30, 1993 [GB] United Kingdom ............... 43 44 924

[51] Int. Cl.[7] ....................................... H04N 7/18
[52] U.S. Cl. .................. 375/240; 348/416; 348/413; 348/415; 348/699
[58] Field of Search .................... 348/700, 699, 348/416, 415, 394, 411, 420; 375/240

[56] References Cited

U.S. PATENT DOCUMENTS

| | | | |
|---|---|---|---|
| 4,914,508 | 4/1990 | Music et al. | 348/416 |
| 5,023,716 | 6/1991 | Nakayama et al. | 348/699 |
| 5,068,722 | 11/1991 | Sugiyama | 348/420 |
| 5,083,860 | 1/1992 | Miyatake et al. | 352/129 |
| 5,107,345 | 4/1992 | Lee | 348/699 |
| 5,200,820 | 4/1993 | Gharavi | 358/105 |
| 5,206,723 | 4/1993 | Parke | 348/699 |
| 5,247,586 | 9/1993 | Gobert et al. | 348/699 |
| 5,387,938 | 2/1995 | Fukuda et al. | 348/420 |

FOREIGN PATENT DOCUMENTS

| | | |
|---|---|---|
| 0 508 476 | of 0000 | European Pat. Off. . |
| 0363677 | 9/1989 | European Pat. Off. . |
| 0499307 | 2/1992 | European Pat. Off. . |
| 0549069 | 12/1992 | European Pat. Off. . |
| 0528366 | 2/1993 | European Pat. Off. . |
| 3732422 | 4/1988 | Germany . |
| 89 08891 | of 0000 | WIPO . |

OTHER PUBLICATIONS

Data Sheet of SGS–Thomson STI3220 Motion Estimation Processor, Jul. 1990.

MPEG 1 (Moving Pictures Expert Group) Image Encoding Standard, (ISO/IEC 11172–1, Aug. 1993).

Primary Examiner—Andy Rao
Attorney, Agent, or Firm—Joseph S. Tripoli; Ronald H. Kurdyla; Alexander J. Burke

[57] ABSTRACT

The computation-intensive task of motion estimation for video signals is performed by block search methods using apparatus of reduced complexity. Motion estimation is performed by analyzing only specific bits, e.g. one or two MSBs, of the picture element values. These bits are logic-linked by means of EXOR and/or EXNOR functions, and the individual results for different block positions of a current block within a search window are combined. The respective motion vector for the current block is determined by using a minimum or maximum comparison.

24 Claims, 2 Drawing Sheets

VIDEO ENCODER AND DECODER IMAGE MOTION ESTIMATION SYSTEM WITH REDUCED COMPUTATION

FIELD OF THE INVENTION

The invention relates to a method and device for estimating movement in video signals.

BACKGROUND OF THE INVENTION

The data-reducing, coding/decoding of digital video signals is, in many cases, based on a motion-compensated interpolation of picture element values (interframe coding). For this purpose, movement vectors or displacement vectors are required for picture element (pixel) blocks. These movement vectors are normally generated in the encoder by means of movement estimation.

A comparison is carried out in each case for a picture element block with, for example, 8×8 luminance picture elements from the current image, within a search zone consisting of an enlarged picture element block of, for example, 16×16 luminance picture elements of the preceding image and referred to as a search window. By means of MSE (mean squared error) or MAE (mean absolute error), within the search zone, the 8×8 block with the highest correlation is determined and from the spatial position of the latter, compared to the block from the current image, the respective movement vector is determined.

This method is extremely computation-intensive and requires very high clock frequency rates. Even in hierarchical search methods complex and high-speed hardware is required.

SUMMARY OF THE INVENTION

An objective of the invention is to provide a less computation-intensive method of estimating movement. An additional objective is to provide apparatus to implement the principles of the invention. In conventional methods of estimating movement, picture element values with a full word length of, for example, 8 bits are used. It has been shown that a movement estimation can also be performed by analyzing only specific bits, for example, one or more MSBs (Most Significant Bits), of the picture element values. For this purpose, these bits (of the picture element values of the current and the preceding and/or following image) are coupled by logic functions and the individual results for the different block positions of the current block (for example, 8*8 block) within the search window are combined in each case. Then, the respective vector for the current block is determined using a minimum or maximum comparison. The logic functions are preferably EXOR (Exclusive OR) or EXNOR (Exclusive NOR) functions. The results of the logic function, within the respective search block, are counted and/or added.

A method according to the invention comprises estimating movement in video signals. A reference picture element block within a search zone is compared with corresponding picture element blocks of one or several adjacent images. A movement vector is determined in accordance with the position showing the highest correlation. In this comparison of the picture element values, only one or more MSBs are used.

Apparatus according to the principles of the invention for estimating movement in video signals is disclosed. A reference picture element block in a search zone is compared with corresponding picture element blocks of one or several adjacent images. A movement vector is determined for the position showing the highest correlation. The apparatus includes storage means (30,40) for storing the reference picture element block and the picture element blocks of one or several adjacent images. The apparatus also includes EXOR or EXNOR gates which are connected to the storage means and which are in each case supplied with only one or more MSBs (most significant bits), of these picture element values. Also included is a means for the addition, counting and intermediate storage of the comparison results for each of these picture element values from the EXOR or EXNOR gates. The addition means determines the movement vector from the search position with the minimum or maximum of the sum or the counting result.

DETAILED DESCRIPTION OF THE DRAWINGS

Figure 1A:
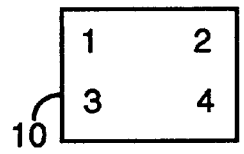
FIG. 1 shows a block from the current image and a search zone from the preceding image.
Figure 1B:
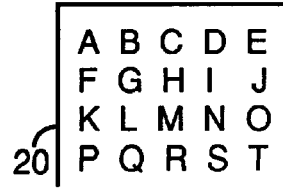

The blocks shown in FIG. 1 relate, for reasons of clarity of layout, to a block size of 2×2 picture elements. In reality block sizes of, for example 8×8 or 16×16 picture elements are used. For the determination of a first combination result, in consecutive cycles CL in an EXOR or EXNOR function, the MSBs of the picture elements of the current block are logic-linked with the MSBs of the search zone picture elements A . . . T (size of the search zone can be arbitrarily selected) in accordance with the following table:

| EXOR | CL |
| --- | --- |
| 1 exclusive-OR with A | 1 |
| 2 exclusive-OR with B | 2 |
| 3 exclusive-OR with F | 3 |
| 4 exclusive-OR with G | 4 |

For the determination of the second combination result, in consecutive cycles CL, the MSBs are logic-linked in accordance with the following table:

| EXOR | CL |
| --- | --- |
| 1 exclusive-OR with B | 1 |
| 2 exclusive-OR with C | 2 |
| 3 exclusive-OR with G | 3 |
| 4 exclusive-OR with H | 4 |

The sequence can differ as follows:

Sequence A)

In accordance with the above tables, firstly with the cycle CL='1', MSB '1' (or the several MSBs corresponding to the position of MSB '1') are simultaneously logic-linked in a corresponding number of EXOR functions with the MSBs (or the several MSBs corresponding to the position of MSB '1') of A, B, C, . . . , N. In cycle CL='1', MSB '2' is simultaneously logic-linked in these EXOR or EXNOR functions with the MSBs of B, C, . . . , O etc. The individual results at the outputs of these EXOR or EXNOR functions are in each case added and intermediately stored. Following the processing of the search zone for a block, in the case of EXOR functions, the minimum of these sums, and in the case of EXNOR functions, the maximum of these sums is determined for the search zone. From the associated search position (i.e. where as many as possible of the 2×2 MSBs of the two blocks are identical) the corresponding movement vector is determined.

Sequence B)

Firstly, with the cycle CL='1', in parallel EXOR or EXNOR functions MSB '1' is logic-linked with MSB 'A', MSB '2' is logic-linked with MSB 'B', MSB '3' is logic-linked with MSB 'F', and MSB '4' is logic-linked with MSB 'G' and directly the combination result or sum of these four individual results is determined and intermediately stored. Then, in cycle CL='2' in parallel EXOR functions MSB '1' is logic-linked with MSB 'B', MSB '2' is logic-linked with MSB 'C', MSB '3' is logic-linked with MSB 'G', and MSB '4' is logic-linked with MSB 'H' and the corresponding combination result is determined etc. Following the processing of the search zone for a block, in the case of EXOR functions the minimum of these sums, and in the case of EXNOR functions the maximum of these sums is determined for the search zone, and from the associated search position (e.g. where as many as possible of the 2×2 MSBs of the two blocks are identical) the corresponding movement vector is determined.

Figure 2:
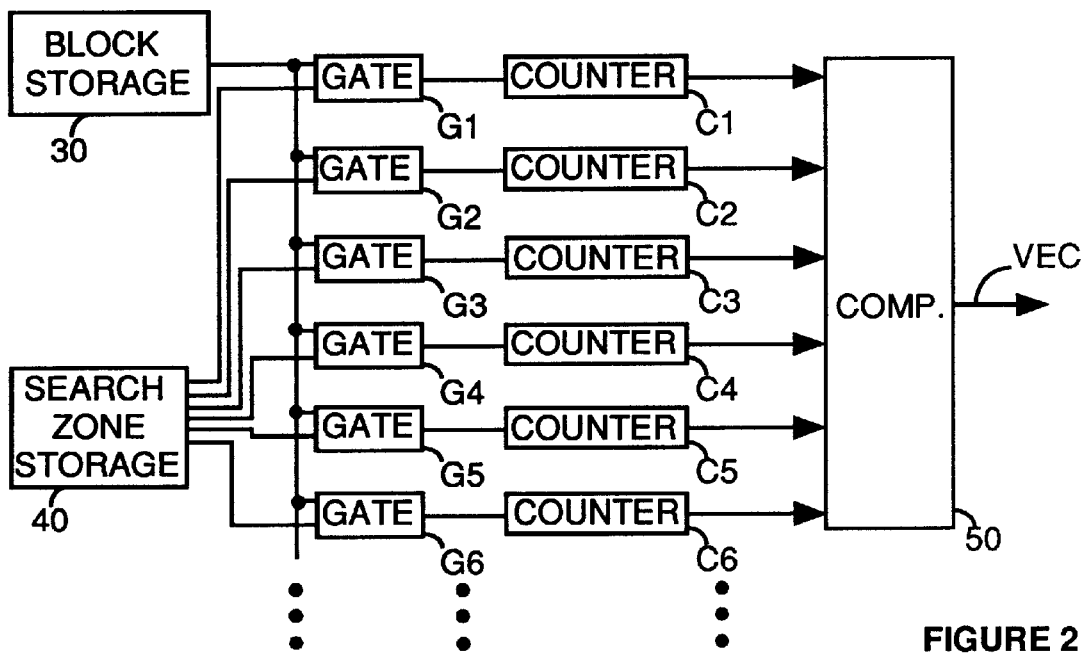
FIG. 2 is a block diagram of a movement estimator according to the invention.

The movement estimator according to FIG. 2 is suitable for sequence A) and contains block storage means 30 for the picture element values or the required bits (for example, the MSB or the 2 or 4 MSBs) of these values of the current block. The picture elements values or the corresponding MSBs for the search zone are stored in search zone storage means 40. The required bit or the required bits of these picture element values are fed to EXOR or EXNOR gates G1, G2, . . . G6 . . . One output of block storage means 30, via which the MSBs '1', '2', '3' and '4' are output, is connected to all the gates. From zone storage means 40, lines corresponding to each of picture elements of the search zone are individually connected to one of the gates G1, G2, . . . G6. The gate output values are added for each of the search positions. Advantage is realized particularly where 1-bit values are involved as this addition of the individual results can be carried out using counters C1, C2, . . . , C6 . . . For each search for a block the maximum or minimum of the counting results is determined in comparator means 50, and from the associated search position the corresponding movement vector is determined.

If a plurality of (n) MSBs are analyzed in parallel for the search, the circuit can be extended in different ways:

a) n gates, n counters (in the case of MSB and MSB$^{-1}$ or MSB$^{-1}$ and MSB$^{-2}$, n=2), which are arranged in parallel in an appropriate fashion;

b) preferably n gates, a counter operating at n-fold speed or an adder;

c) as a) or b) but a defined value, for example 48, is added to or subtracted from one or more of the MSBs from block storage 30 and from search zone storage 40 prior to the gate logic functions. This defined value or defined values can be continuously adapted to an image parameter, for example, image brightness;

d) not always the same bits need to be analyzed, for example within a block in each case two of the bits MSB, MSB$^{-1}$ and MSB$^{-2}$ may be selected.

These possibilities can also be combined in an appropriate fashion.

Figure 3:
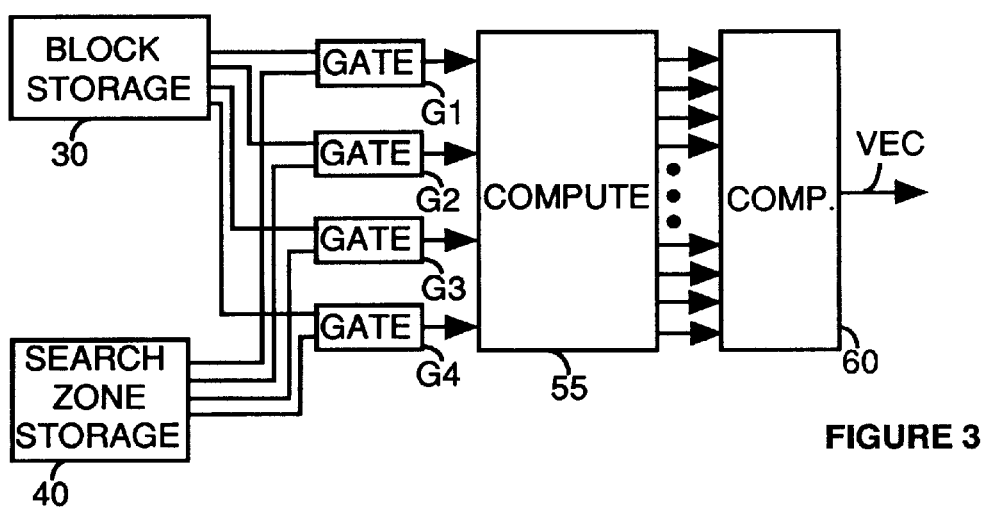
FIG. 3 is a block diagram of a further movement estimator according to the invention.

The movement estimator according to FIG. 3 is suitable for sequence B) and contains block storage means 30 for storage of the picture element values, or the required bits (e.g. the MSB or the 2 or 4 MSBs) of these values of the current block. The picture element values or the corresponding MSBs for the search zone are stored in search zone storage means 40. Block storage 30 has four outputs (depending upon the block size), each of which is connected to one of the four EXOR or EXNOR gates G1 . . . G4 and through which the required bit or required bits of these picture element values are coupled to the gates. The search zone storage means 40 is similarly connected to gates G1 . . . G4. The gate output values are added for all of the search positions and intermediately stored in computation circuit 55. Advantage is realized by the use of 1-bit values as this permits the addition of the individual results by computation circuit 55 to be carried out using counters. For each search for a block, the maximum or minimum of the counter results is determined in the following comparator means 60. The corresponding movement vector is determined from the associated search position.

The alternative circuit configuration described in connection with FIG. 2 may also be applied in a corresponding fashion to the circuit of FIG. 3. The invention may also be used to produce (for example, local) movement vectors in a decoder.

In the case of moving image content in interlaced images, the vector search may also be carried out within blocks which are composed only of lines of one field. In addition the search zone may also be non-square and/or varied in its dimensions. In particular, the search zone may be varied as a function of prior search results in time or prior search results in space. The invention is also applicable to the vector search for a reference block by comparison with corresponding blocks of a preceding and a following image (double-sided block matching).

Instead of MSE or MAE it is also possible to use other methods of fault level calculation. Instead of determining the movement vector in accordance with the respective highest correlation, it is also possible to deliberately not select the position of the highest correlation in the case when a closely located position is better adapted to the surrounding vectors. The invention may also be applied for example in MPEG TV systems, in digital video recorders and in moving image transmission via telephone lines (ISDN).

Figure 4:
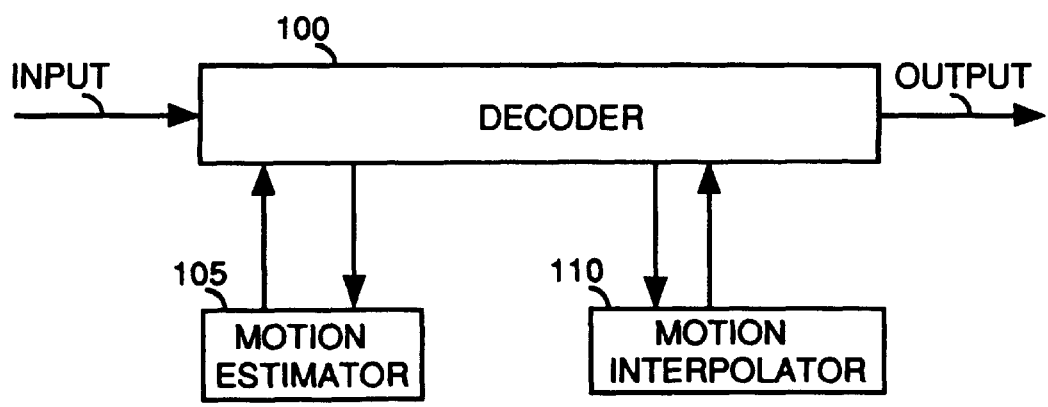
FIG. 4 is a block diagram of a digital video receiver system incorporating the invention.

FIG. 4 is a block diagram of a digital video receiver system for receiving a video input signal via telephone transmission, for example, and including motion estimator 105 according to the invention. The digital video receiver system also includes decoder 100 and motion interpolator 110 for decoding and interpolation.

What is claimed is:

1. A method of estimating movement in an image produced by a video signal, comprising the steps of:

a) comparing picture element values in a reference block of a first video image with corresponding picture element values in a search zone block of a second video image, wherein said comparison is performed using a number of bits N, less than all of the bits used to represent a picture element value; and b) computing a movement vector using a relative position of a matching search zone block to said reference block, wherein said matching search zone block gives a highest correlation of picture element values with the picture element values of said reference block.

2. The method defined in claim 1, wherein step (a) comprises the step of comparing the picture element values in said reference block of said first video image with corresponding picture element values in said search zone block of a plurality of video images, wherein said comparison is performed using less than all of the bits used to represent a picture element value.

3. A method of estimating movement in an image produced by a video signal, comprising the steps of:
   a) comparing picture element values in a reference block of a first video image with corresponding picture element values in a search zone block of a second video image, wherein said comparison is performed using less than all of the bits used to represent a picture element value and also using a logical function including an exclusive-OR function; and
   b) computing a movement vector using a relative position of a matching search zone block to said reference block, wherein said matching search zone block gives a highest correlation of picture element values with the picture element values of said reference block.

4. The method defined in claim 3, wherein
   step (b) comprises the step of computing said movement vector using the relative position of said matching search zone block to said reference block, wherein:
   said matching search zone block gives the highest correlation of picture element values with the picture element values of said reference block; and
   said movement vector is determined from the matching search zone block with the maximum count value produced by adding the result of said logic function.

5. The method defined in claim 3, wherein
   step (b) comprises the step of computing said movement vector using the relative position of said matching search zone block to said reference block, wherein:
   said matching search zone block gives the highest correlation of picture element values with the picture element values of said reference block; and
   said movement vector is determined from the matching search zone block with a minimum count value produced by counting the result of said logic function.

6. The method defined in claim 4, wherein
   said number of bits, N, is greater than 1 and
   said movement vector is determined from said matching search zone block with said count value being produced by counting a result of said logic function using n parallel counters.

7. The method defined in claim 4, wherein
   said number of bits, N, is greater than 1 and
   said movement vector is determined from said matching search zone block with said count value being produced by counting the result of said logic function using a counter with at least n times the speed of said logic function output.

8. The method defined in claim 1, wherein step (a) comprises the sequential steps of:
   c) adding a fixed value corresponding to an image parameter to the picture element values in said reference block; and
   d) subsequently comparing the picture element values in said reference block of said first video image with corresponding picture element values in said search zone block of said second video image, wherein said comparison is performed using a number of bits N, less than all of the bits used to represent a picture element value.

9. The method defined in claim 1, wherein step (a) comprises the steps of:
   c) adding a fixed value corresponding to an image parameter to the picture element values in said search zone block; and
   d) subsequently comparing the picture element values in said reference block of said first video image with corresponding picture element values in said search zone block of said second video image, wherein said comparison is performed using a number of bits N, less than all of the bits used to represent a picture element value.

10. The method defined in claim 1, wherein
    step (a) comprises the step of comparing the picture element values in said reference block of said first video image with corresponding picture element values in said search zone block of a second video image, wherein said comparison is performed using less than all of the bits used to represent a picture element value and different bits are compared for different picture element values.

11. The method defined in claim 1 wherein said video signal is used in a digital video receiver system.

12. The method defined in claim 1 wherein said video signal is transmitted via telephone lines.

13. Apparatus for estimating movement in an image produced by a video signal, by comparing picture element values in a reference block of a first video image with corresponding picture element values in a search zone block of a second video image, and by computing a movement vector using a relative position of a matching search zone block to said reference block, wherein said matching search zone block picture element values have a highest correlation, as a function of a count value, with said reference block picture element values, said apparatus comprising:
    a first memory for storing said reference block picture element values of a first video image;
    a second memory for storing said search zone block picture element values of a second video image;
    a logic network including an exclusive-OR function and connected to said first and said second memory, said logic network using a number of bits N, less than all of the bits used to represent a picture element value and providing picture element value comparison results as an output; and
    means for processing said comparison results to determine said movement vector from a search position with a maximum resultant count value.

14. Apparatus according to claim 13, wherein
    said processing means includes addition and counting means to determine said movement vector from the search position with a minimum resultant count value.

15. Apparatus according to claim 13, wherein
    said processing means additionally include intermediate storage means.

16. Apparatus according to claim 13, wherein
    said number of bits, N, is greater than 1 and
    said movement vector is determined from said matching search zone block with said resultant count value produced by adding said comparison results using N parallel counters.

17. Apparatus according to claim 13, wherein
    said number of bits, N, is greater than 1 and
    said movement vector is determined from said matching search zone block with said resultant count value produced by adding said comparison results using a counter with at least N times the speed of said logic network output.

18. Apparatus according to claim 13, further including an adding network for adding a fixed value corresponding to an image parameter to said picture element values in said search zone block prior to comparing said picture element values.

19. Apparatus according to claim 13 wherein said video signal is used in a digital video receiver system.

20. The method defined in claim 3, further including an inverter to convert said exclusive-OR function to an exclusive-NOR function.

21. The apparatus defined in claim 13, further including an inverter to convert said exclusive-OR function to an exclusive-NOR function.

22. The method defined in claim 1, wherein said picture element values are luminance values.

23. The method defined in claim 3, wherein said picture element values are luminance values.

24. The apparatus defined in claim 13, wherein said picture element values are luminance values.

* * * * *

UNITED STATES PATENT AND TRADEMARK OFFICE
CERTIFICATE OF CORRECTION

PATENT NO. : 6,108,378
DATED : August 22, 2000
INVENTOR(S) : Heinz-Werner Keesen It is certified that error appears in the above-identified patent and that said Letters Patent is hereby corrected as shown below:

Title page,
Under "Foreign Application Priority Data", delete "[GB] United Kingdom" and on that line add -- [DE] Germany --

Signed and Sealed this

Sixteenth Day of October, 2001

Attest:

*Attesting Officer*

NICHOLAS P. GODICI
*Acting Director of the United States Patent and Trademark Office*